July 30, 1957  G. CONFORTO  2,801,163
APPARATUS AND METHOD FOR DECOMPOSING AN AMALGAM
Filed Sept. 17, 1956
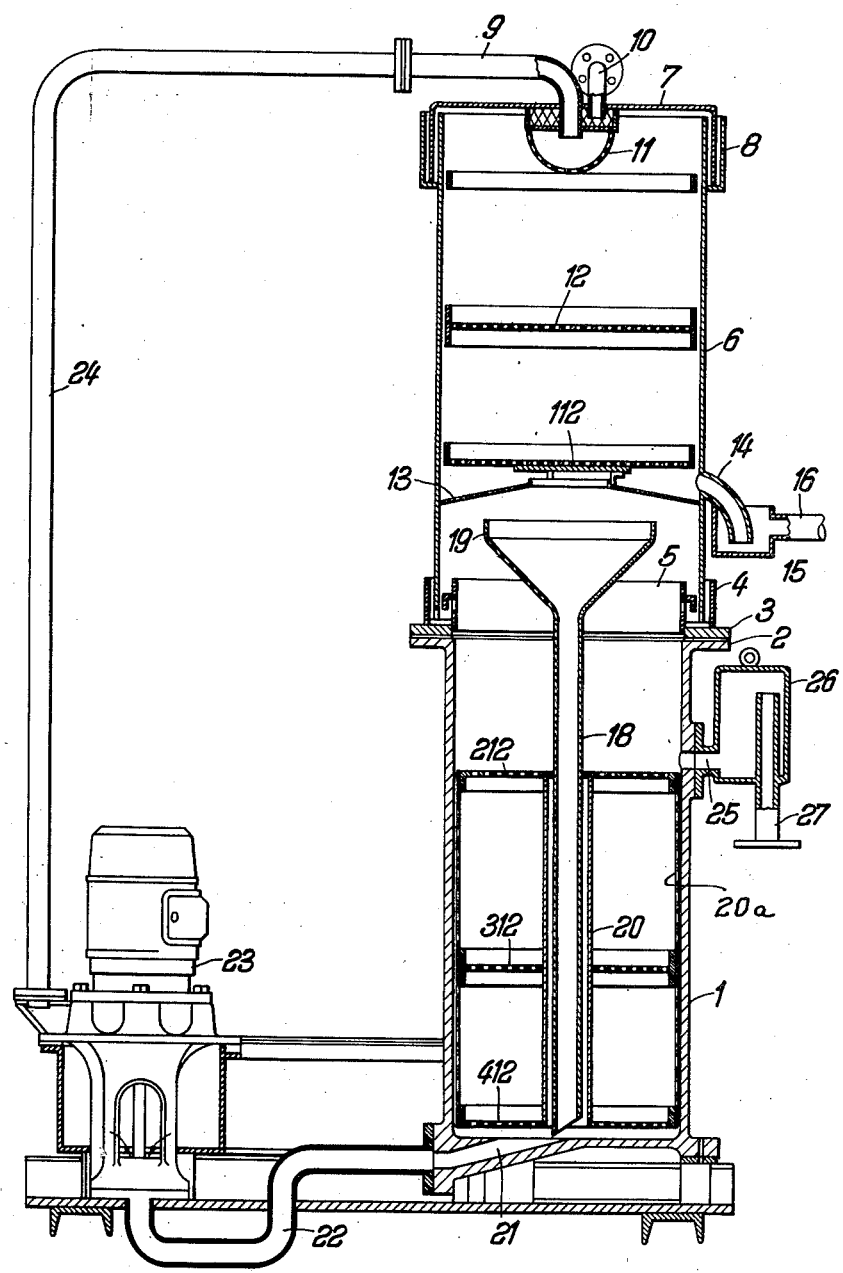
Inventor:
Gaetano Conforto
BY: Michael S. Striker
Agt.

2,801,163

APPARATUS AND METHOD FOR DECOMPOSING AN AMALGAM

Gaetano Conforto, Genoa, Italy, assignor to Pintsch Bamag A.-B., Berlin, Germany Application September 17, 1956, Serial No. 610,364

12 Claims. (Cl. 75—121)

The present invention relates to an apparatus and method for decomposing an amalgam, and more particularly it relates to an apparatus and method for decomposing an alkali amalgam.

Vertical cells which are customarily used for the decomposition of alkali amalgams operate in countercurrent flow, i. e., the hydroxide or water which is to react with the amalgam passes the same in a direction opposite to the direction of flow of the amalgam. Such apparatus requires tight packings and flanges so as to withstand the effect of concentrated hydroxides, primarily alkali hydroxides, at a temperature exceeding 100° C. and at the overpressure in the vertical cell. Consequently the exchange of the catalysts or catalyst carriers which serve within the cell for decomposition of the amalgam is difficult and has to be done with great care so as to reestablish fluid-tightness after the new catalyst has been placed in the cell. Considerable expense is involved in providing the necessary structure, packing materials and labor involved in maintaining such vertical decomposition cells in fluid-tight condition.

It is therefore an object of the present invention to provide an apparatus and a method for decomposing an amalgam which overcomes the above described difficulties.

It is another object of the present invention to provide an apparatus and method for decomposing an alkali amalgam which can be economically built and operated.

It is a further object of the present invention to provide an apparatus for decomposing an alkali amalgam which does not require expensive special flanges and packings in order to remain fluid-tight.

It is a further object of the present invention to provide an apparatus and method for decomposing an alkali amalgam according to which the area of contact between the amalgam and the water or alkali hydroxide is increased in relation to the volume of the decomposition cell.

Other objects and advantages of the present invention will become apparent from a further reading of the description and the appended claims.

With the above and other objects in view, the present invention mainly consists in an amalgam decomposer comprising, in combination, a first and a second decomposer cell, means for introducing into the first decomposer cell an alkali amalgam permitting the same to pass through the first decomposer cell pretreating it therein, means for transferring the pretreated amalgam after having passed through the first decomposer cell into the second decomposer cell permitting it to pass through the same, means for introducing water into the second decomposer cell and passing the same through the second cell in parallel current to the pretreated amalgam passing through the second cell thereby forming from the amalgam and water, mercury and aqueous alkali hydroxide, means for passing the aqueous alkali hydroxide through the first cell in countercurrent to the amalgam introduced therein thereby transforming the amalgam into pretreated amalgam, means for removing the aqueous alkali hydroxide after having passed through the first decomposer cell, and means for removing the formed mercury from the second decomposer cell.

In a preferred embodiment, the present invention consists in an alkali amalgam decomposer comprising, in combination, a first decomposer cell, a second decomposer cell having a wall including a lower end portion removably positioned on top of the first decomposer cell and communicating with the same, sealing means for fluid-tightly connecting the first and second cells, means for introducing alkali amalgam into the upper portion of the first cell, the alkali amalgam flowing downwardly to the bottom portion of the first cell, a conduit having a funnel-shaped enlarged upper end portion extending from the lower portion of the second cell downwardly through substantially the entire length of the first cell, conduit means for passing alkali amalgam from the bottom portion of the first cell to the upper portion of the second cell the conduit means including pumping means for pumping the amalgam, water supply means for passing water into the upper portion of the second cell, mixing means located in the upper portion of the second cell for mixing water and alkali amalgam passed from the water supply means and from the conduit means, respectively, into the upper portion of the second cell, and for passing the thus-formed mixture into the main portion of the second cell, carrying means for carrying amalgam decomposition catalyst, arranged in the second cell between the upper portion thereof and the funnel-shaped enlarged upper end portion of the vertical conduit, the carrying means being adapted for passing fluids therethrough, whereby the mixture of water and alkali amalgam passing from the mixing means will be reacted upon contact with an amalgam decomposition catalyst carried by the carrying means so as to form mercury and an aqueous alkali hydroxide, the mercury and the aqueous alkali hydroxide passing through the carrying means, separating means located between the carrying means and the funnel-shaped end portion of the conduit for separating mercury from aqueous alkali hydroxide and for passing the aqueous alkali hydroxide into the funnel-shaped end portion, means for removing aqueous alkali hydroxide from the upper portion of the first cell, and means for removing the separated mercury from the amalgam decomposer, whereby amalgam introduced into the upper portion of the first cell will pass in countercurrent with aqueous alkali hydroxide downwardly through the first cell into the conduit means and through the conduit means into the mixing means, a mixture of water and alkali amalgam formed in the mixing means will pass in parallel current through the carrying means in the second cell, and will be reacted by an amalgam decomposition catalyst on the carrying means so as to form mercury and aqueous alkali hydroxide, the mixture being separated into mercury and aqueous alkali hydroxide, respectively, the mercury being removed from the amalgam decomposer and the aqueous alkali hydroxide flowing through the conduit to the bottom portion of the first cell and upwardly through the cell outside of the conduit in counter-current flow to the alkali amalgam introduced into the upper portion of the first cell, the aqueous alkali hydroxide then being removed from the upper portion of the first cell.

The present invention also contemplates a method of decomposing an amalgam, comprising the steps of introducing an amalgam into a first decomposer cell permitting it to pass therethrough, pretreating the amalgam in the first decomposer cell in countercurrent flow with an aqueous hydroxide, transferring the pretreated amalgam after having passed through the first decomposer cell into a second decomposer cell permitting it to pass through the same, passing water through the second decomposer cell in parallel current to the pretreated amalgam passing therethrough, thereby forming from the amalgam and water, mercury and an aqueous hydroxide, separating the thus-formed mercury and aqueous hydroxide from each other, and introducing the separated aqueous hydroxide into the first decomposer cell for pretreating amalgam therein.

According to the present invention an improved vertical decomposer cell has been devised which utilizes the difference in mass, specific weight and speed of flow of mercury and amalgam as compared with water and aqueous alkali hydroxide for decomposing the amalgam with an aqueous liquid while the amalgam and the aqueous liquid flow in parallel current through the decomposer cell.

The amalgam decomposer disclosed herein has two decomposer cells one of which is positioned on top of the other. The upper or second decomposer cell is adapted for having amalgam and water pass downwardly therethrough in an intimate mixture thereby being reacted so as to form mercury and an alkali hydroxide. The thus formed hydroxide flows into the lower or first decomposer cell and is mixed therein with freshly added amalgam, while the mercury formed in the second or upper decomposer cell is removed from the same. The aqueous hydroxide formed in the second cell flows into the lower first cell through a conduit which releases the aqueous hydroxide in the bottom portion of the first cell, while fresh amalgam is introduced in the upper portion of the first cell. The aqueous hydroxide moves upwardly from the bottom to the upper portion of the first cell, while the freshly introduced amalgam moves countercurrently downwardly through the first cell and is pretreated or partially decomposed by contact with the countercurrently moving aqueous hydroxide. The pretreated amalgam leaves the first cell from the bottom portion thereof and passes through a conduit to the upper portion of the second cell. As stated above, the pretreated amalgam flows then downwardly through the second cell while mixed with water which water also flows downwardly in parallel current with the decomposing amalgam.

Thus, the amalgam decomposer according to the present invention does not require flanges and packings which would come in contact with and have to be resistant against concentrated aqueous hydroxide. Furthermore, the novel construction of the amalgam decomposer according to the present invention which employs liquid sealing means for fluid-tightly connecting the first and second cells, permits in a simple and quick manner the removal of the upper or second cell as well as remounting of the same.

Furthermore, in order to obtain higher temperatures during the decomposition of the amalgam and consequently to increase the speed of the reaction, the contact between the amalgam and the aqueous liquid in combination with the action of a catalyst, preferably graphite, is increased, without retarding the flow of the amalgam in the aqueous liquid. Thus for equal output, the size and volume of the decomposer cells according to the present invention can be kept considerably smaller than the dimension of prior art vertical decomposer cells.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which the figure is a schematic elevational view, partially in cross section of an amalgam decomposer according to the present invention.

Referring now to the drawing, a first vertical cell 1 is shown, provided on its upper end with a flange 2 on which a flange 3 is positioned. Concentric rings 4 and 5 are mounted on flange 3 and define between themselves an annular channel. The annular channel formed by flange 3 and concentric rings 4 and 5 is adapted to be filled with a sealing fluid and provides sealing means for fluid-tightly connecting decomposer cell 1 with a second decomposer cell 6, the lower rim of which rests on the bottom of the channel formed by flange 3 and concentric rings 4 and 5. The second decomposer cell 6 is thus positioned on top of the first decomposer cell 1 and communicating with the same. The second decomposer cell 6, as shown in the drawing, is formed with an open bottom.

First decomposer cell 1 is formed with a bottom in which a conduit 21 is provided for passing pretreated amalgam from the bottom portion of the decomposer cell 1 through U-shaped conduit 22, pump 23, conduits 24 and 9 into the upper portion of second cell 6. Conduits 21, 22, 24 and 9 together with pump 23 form conduit means for passing amalgam or pretreated amalgam from the bottom portion of the first cell 1 to the upper portion of the second cell 6. Lower cell 1 is provided in its upper portion with pipe 25 which together with chamber 26 and pipe 27 form means for removing aqueous alkali hydroxides from first decomposer cell 1 and thereby from the amalgam decomposer. Second or upper decomposer cell 6 is provided on its upper end with a lid 7 formed with a downwardly extending rim portion. The downwardly extending rim portion of the lid 7 rests at the bottom of a channel formed by wall 8 and the upper portion of the wall surrounding cell 6. The thus formed channel is adapted to be filled with liquid so as to form a hydraulic closure between lid 7 and the upper end of cell 6. Conduit 9, forming part of the means for transferring pretreated amalgam from first decomposer cell 1 to second decomposer cell 6, extends through lid 7 into the interior of second decomposer cell 6. A conduit 10 connected with a source of water supply also extends through lid 7 into second decomposer cell 6 and forms a means for introducing water into decomposer cell 6. Conduits 9 and 10 terminate inside a perforated hollow tube-like member 11, constituting mixing means attached to the inner face of lid 7 and located in the upper portion of second decomposer cell 6. Pretreated amalgam and water introduced into mixing means 11 will be mixed therein and will be passed from there downwardly into the main portion of second decomposer cell 6. Perforated plates 12 and 112 are arranged inside second decomposer cell 6, and perforated plates 212, 312 and 412 are arranged within first decomposer cell 1. Perforated plates 12 and 112 constitute means for carrying an amalgam decomposition catalyst inside second decomposer cell 6, and carrying means 212, 312, and 412 constitute means for carrying a decomposition catalyst inside first decomposer cell 1. During operation of the cell, the catalyst, usually graphite, is placed on perforated plates 12, 112, 212, 312 and 412. Perforated plates 212, 312 and 412 are located in and engage cylindrical perforated member 20a.

The mixture of water and pretreated amalgam formed in mixing means 11 flows downwardly in parallel current through perforated plates 12 and 112, thus coming in intimate contact with the graphite catalyst thereon. Amalgam flowing downwardly through first decomposer cell 1 and aqueous alkali hydroxide flowing upwardly through first decomposer cell 1, pass through perforated plates 212, 312 and 412, so that freshly introduced amalgam and aqueous alkali hydroxide are intimately mixed and brought in contact with the catalyst while flowing in countercurrent through first decomposer cell 1. An outwardly and downwardly inclined conical baffle member 13 is arranged in second decomposer cell 6 below the lowest catalyst carrying plate 112 inside cell 6. Baffle member 13 is welded to the center portion of carrying plate 12. The perforations in the center portion of carrying plate 112 are covered so that the mercury and aqueous alkali hydroxide mixture passing through plate 112 can only pass through the outer annular portion thereof. A pipe 14 extends outwardly from the wall of second decomposer cell 6 and communicates with the interior of second decomposer cell 6 between lowest catalyst carrier plate 112 and the conical baffle member 13. Tube 14 terminates in the lower portion of a mercury collecting vessel 15 from which a tube 16 removes mercury to a storage container (not shown). From the storage container, mercury may be fed into the electrolytic cell in which the amalgam is formed. Baffle plate 13 and tube 14 constitute separating means for separating mercury from aqueous hydroxide. As stated further above a mixture of mercury and aqueous hydroxide passes through carrying plate 112 and collects on the inclined frusto-conical baffle plate 13. Baffle plate 13 is formed with a center opening on its upper end. Mercury being heavier than aqueous alkali hydroxide forms a layer on baffle plate 13 which rises to the height of tube 14 and is removed therethrough, while aqueous alkali hydroxide swimming on top of the mercury layer drops through the center hole formed in frusto-conical baffle plate 13. The aqueous hydroxide drops through the center hole of baffle plate 13 into the funnel-shaped upper end portion 19 of conduit 18 which extends downwardly through substantially the entire length of first decomposer cell 1. Conduit 18 is partially surrounded by pipe 20 to which perforated plates 212, 312 and 412 are attached.

Decomposition of amalgam in second decomposer cell 6 is accomplished as follows:

Pump 23 pumps pretreated amalgam through pipes 24 and 9 into mixing means 11 located in the upper portion of second decomposer cell 6. Simultaneously water emanating from pipe 10 is introduced into the mixing means 11. Water and pretreated amalgam are mixed in mixer 11 and pass through the sprinkler openings of the same. The mixture of pretreated amalgam and water then passes downwardly through second decomposer cell 6, thereby also passing through plates 12 and 112 and coming in contact with the graphite catalyst placed on these plates. Thereby the major portion of the amalgam is decomposed. Mercury flowing through the open holes in the outer annular portion of plate 112 collects on buffer plate 13 and forms a layer thereon which reaches the opening of pipe 14. Mercury is then continuously removed through pipe 14 into container 15. Mercury collecting in container 15 rises to a height above the lower opening of pipe 14, thus forming a fluid seal. When the mercury in container 15 reaches the level of tube 16, it flows through tube 16 to a storage container.

Thus the circular flow of the mercury is as follows:

From an electrolytic cell or another source, amalgam flows through a conduit into the channel formed between concentric rings 4 and 5, passes through an overflow from the channel into the upper portion of the decomposer cell 1 and flows downwardly through the same. From the bottom of decomposer cell 1, the amalgam which has been pretreated in decomposer cell 1 as will be shown further below, passes into conduit 21. As stated further above, aqueous alkali hydroxide flows through the funnel-shaped upper end portion 19 of conduit 18, and through conduit 18 into the bottom portion of decomposer cell 1. However, the aqueous alkali hydroxide cannot pass into conduit 21, since the heavier pretreated amalgam which flows through conduit 21 prevents the aqueous alkali hydroxide from entering the same. Thus the aqueous alkali hydroxide flows upwardly through the decomposer cell 1 outside of pipe 20, and in countercurrent to the amalgam flowing downwardly through decomposer cell 1. Thus amalgam and aqueous alkali hydroxide come in contact with each other and also with the catalyst located on perforated plates 212, 312 and 412, so that the amalgam during its downward flow through decomposer cell 1 is already partially decomposed and thus pretreated. The pretreated amalgam then flows through conduits 21, 22, pump 23, conduits 24 and 9 into the second decomposer cell 6 and flows downwardly through the same in parallel current with water coming from conduit 10. Thereby decomposition is completed and mercury is removed from the second decomposer cell 6 through pipe 14.

The circular flow of water through the amalgam decomposer of the present invention is as follows: water introduced through pipe 10 flows in parallel current with pretreated amalgam downwardly through second decomposer cell 6, thereby decomposing the amalgam and forming an aqueous alkali hydroxide. The aqueous alkali hydroxide which collects on top of the mercury layer formed on conical buffer plate 13 then flows through the center hole in conical buffer plate 13 into the funnel-shaped enlarged end portion 19 of conduit 18 and downwardly through conduit end 18 to the bottom portion of first decomposer cell 1. Since the aqueous alkali hydroxide is prevented from entering conduit 21 by the amalgam filling the same, the aqueous alkali hydroxide rises upwardly through first decomposer cell 1, passing in countercurrent flow with the downwardly flowing amalgam through perforated plates 412, 312 and 212 on which preferably a graphite catalyst is located, thus causing pretreatment and partial decomposition of the amalgam. The alkali hydroxide after passing through perforated plate 212 flows into tube 25 and leaves the amalgam decomposer through overflow 26 and 27. If sodium amalgam is being decomposed, the aqueous alkali hydroxide leaving the amalgam decomposer will of course be an aqueous solution of sodium hydroxide.

It should be noted, that the amalgam decomposer according to the present invention is built of relatively simple elements which can be easily mounted upon each other. Similarly, the second decomposer cell 6 can easily be lifted off the top of first decomposer cell 1 since the fluid-tight connection between the two cells is accomplished by an amalgam liquid seal and without any flanges or packings which would first have to be disassembled or assembled, respectively.

The method of the present invention essentially consists in a pretreatment and partial decomposition of an alkali amalgam by means of an aqueous liquid such as water or an aqueous hydroxide solution flowing in countercurrent to the amalgam, preferably while the amalgam and the aqueous liquid are in contact with each other and also with a decomposition catalyst. The thus pretreated amalgam is then introduced into a second decomposer cell in which decomposition of the amalgam is completed in parallel current with water, also preferably employing a decomposition catalyst with which the mixture of pretreated amalgam and water come in contact. The mercury thus formed by decomposition of the amalgam is then separated from the aqueous hydroxide and removed, while the aqueous hydroxide passes into the amalgam pretreatment cell in which the same acts on freshly introduced amalgam so as to pretreat and partially decompose the same.

It will be understood that each of the elements described above, or two or more together, may also find a useful application in other types of amalgam decomposers differing from the types described above.

While the invention has been illustrated and described as embodied in a two-cell alkali amalgam decomposer, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An amalgam decomposer comprising, in combination, a first and a second decomposer cell; means for introducing into said first decomposer cell an alkali amalgam permitting the same to pass through said first decomposer cell pretreating it therein; means for transferring said pretreated amalgam after having passed through said first decomposer cell into said second decomposer cell permitting it to pass through the same; means for introducing water into said second decomposer cell and passing the same through said second cell in parallel current to said pretreated amalgam passing through said second cell thereby forming from said amalgam and water, mercury and aqueous alkali hydroxide; means for passing said aqueous alkali hydroxide through said first cell in countercurrent to said amalgam introduced therein thereby transforming said amalgam into pretreated amalgam; means for removing said aqueous alkali hydroxide after having passed through said first decomposer cell; and means for removing said formed mercury from said second decomposer cell.

2. An amalgam decomposer comprising, in combination, a first cell; a second decomposer cell located above said first decomposer cell; means for introducing into said first decomposer cell an alkali amalgam permitting the same to pass downwardly through said first decomposer cell pretreating its therein; means for transferring said pretreated amalgam after having passed through said first decomposer cell into the upper portion of said second decomposer cell permitting it to pass downwardly through the same; means for introducing water into the upper portion of said second decomposer cell and passing the same downwardly through said second cell in parallel current to said pretreated amalgam passing through said second cell thereby forming from said amalgam and water, mercury and aqueous alkali hydroxide; means for passing said aqueous alkali hydroxide upwardly through said first cell in countercurrent to said amalgam introduced therein thereby transforming said amalgam into pretreated amalgam; means for removing said aqueous alkali hydroxide after having passed through said first decomposer cell; and means for removing said formed mercury from the lower portion of said second decomposer cell.

3. An amalgam decomposer comprising, in combination, a first cell; a second decomposer cell located above said first decomposer cell; means for carrying an amalgam decomposition catalyst located in said second decomposer cell; means for introducing into said first decomposer cell an alkali amalgam permitting the same to pass downwardly through said first decomposer cell pretreating it therein; means for transferring said pretreated amalgam after having passed through said first decomposer cell into the upper portion of said second decomposer cell permitting it to pass downwardly through the same; means for introducing water into the upper portion of said second decomposer cell and passing the same downwardly through said second cell in parallel current to said pretreated amalgam passing through said second cell thereby forming from said amalgam and water, mercury and aqueous alkali hydroxide; means for passing said aqueous alkali hydroxide upwardly through said first cell in countercurrent to said amalgam introduced therein thereby transforming said amalgam into pretreated amalgam; means for removing said aqueous alkali hydroxide after having passed through said first decomposer cell; and means for removing said formed mercury from the lower portion of said second decomposer cell.

4. An amalgam decomposer comprising, in combination, a first cell; a second decomposer cell located above said first decomposer cell; means for carrying an amalgam decomposition catalyst located in said second decomposer cell; means for introducing into said first decomposed cell an alkali amalgam permitting the same to pass downwardly through said first decomposer cell pretreating it therein; means for transferring said pretreated amalgam after having passed through said first decomposer cell into the upper portion of said second decomposer cell permitting it to pass downwardly through the same; means for introducing water into the upper portion of said second decomposer cell and passing the same downwardly through said second cell in parallel current to said pretreated amalgam passing through said second cell thereby forming from said amalgam and water, mercury and aqueous alkali hydroxide; means for separating the thus-formed mercury and aqueous alkali hydroxide from each other; means for passing said aqueous alkali hydroxide upwardly through said first cell in countercurrent to said amalgam introduced therein thereby transforming said amalgam into pretreated amalgam; means for removing said aqueous alkali hydroxide after having passed through said first decomposer cell; and means for removing said formed mercury from the lower portion of said second decomposer cell.

5. An amalgam decomposer comprising, in combination, a first decomposer cell; a second decomposer cell having a wall including a lower end portion removably positioned on top of said first decomposer cell and communicating with the same; sealing means for fluid-tightly connecting said first and second cells; means for introducing amalgam into the upper portion of said first cell, said amalgam flowing downwardly to the bottom portion of said first cell; a conduit having a funnel-shaped enlarged upper end portion extending from the lower portion of said second cell downwardly through substantially the entire length of said first cell; conduit means for passing amalgam from the bottom portion of said first cell to the upper portion of said second cell; water supply means for passing water into the upper portion of said second cell; mixing means located in the upper portion of said second cell for mixing water and amalgam passed from said water supply means and from said conduit means, respectively, into said upper portion of said second cell, and for passing the thus-formed mixture into the main portion of of said second cell; carrying means for carrying amalgam decomposition catalyst, arranged in said second cell between said upper portion thereof and said funnel-shaped enlarged upper end portion of said vertical conduit, said carrying means being adapted for passing fluids therethrough, whereby said mixture of water and amalgam passing from said mixing means will be reacted upon contact with an amalgam decomposition catalyst carried by said carrying means so as to form mercury and an aqueous metal hydroxide, said mercury and said aqueous hydroxide passing through said carrying means; separating means located between said carrying means and said funnel-shaped end portion of said conduit for separating mercury from aqueous metal hydroxide and for passing said aqueous metal hydroxide into said funnel-shaped end portion; means for removing aqueous metal hydroxide from the upper portion of said first cell; and means for removing said separated mercury from said amalgam decomposer, whereby amalgam introduced into said upper portion of said first cell will pass in countercurrent with aqueous metal hydroxide downwardly through said first cell into said conduit means and through said conduit means into said mixing means, a mixture of water and amalgam formed in said mixing means will pass in parallel current through said carrying means in said second cell, and will be reacted by an amalgam decomposition catalyst on said carrying means so as to form mercury and aqueous metal hydroxide, said mixture being separated into mercury and aqueous metal hydroxide, respectively, said mercury being removed from said amalgam decomposer and said aqueous metal hydroxide flowing through said conduit to the bottom portion of said first cell and upwardly through said cell outside of said conduit in countercurrent flow to said amalgam introduced into the upper portion of said first cell, said aqueous metal hydroxide then being removed from said upper portion of said first cell.

6. An alkali amalgam decomposer comprising, in combination, a first decomposer cell; a second decomposer cell having a wall including a lower end portion removably positioned on top of said first decomposer cell and communicating with the same; sealing means for fluid-tightly connecting said first and second cells; means for introducing alkali amalgam into the upper portion of said first cell, said alkali amalgam flowing downwardly to the bottom portion of said first cell; a conduit having a funnel-shaped enlarged upper end portion extending from the lower portion of said second cell downwardly through substantially the entire length of said first cell; conduit means for passing alkali amalgam from the bottom portion of said first cell to the upper portion of said second cell said conduit means including pumping means for pumping said amalgam; water supply means for passing water into the upper portion of said second cell; mixing means located in the upper portion of said second cell for mixing water and alkali amalgam passed from said water supply means and from said conduit means, respectively, into said upper portion of said second cell, and for passing the thus-formed mixture into the main portion of said second cell; carrying means for carrying amalgam decomposition catalyst, arranged in said second cell between said upper portion thereof and said funnel-shaped enlarged upper end portion of said vertical conduit, said carrying means being adapted for passing fluids therethrough, whereby said mixture of water and alkali amalgam passing from said mixing means will be reacted upon contact with an amalgam decomposition catalyst carried by said carrying means so as to form mercury and an aqueous alkali hydroxide, said mercury and said aqueous alkali hydroxide passing through said carrying means; separating means located between said carrying means and said funnel-shaped end portion of said conduit for separating mercury from aqueous alkali hydroxide and for passing said aqueous alkali hydroxide into said funnel-shaped end portion; means for removing aqueous alkali hydroxide from the upper portion of said first cell; and means for removing said separated mercury from said amalgam decomposer, whereby amalgam introduced into said upper portion of said first cell will pass in countercurrent with aqueous alkali hydroxide downwardly through said first cell into said conduit means and through said conduit means into said mixing means, a mixture of water and alkali amalgam formed in said mixing means will pass in parallel current through said carrying means in said second cell, and will be reacted by an amalgam decomposition catalyst on said carrying means so as to form mercury and aqueous alkali hydroxide, said mixture being separated into mercury and aqueous alkali hydroxide, respectively, said mercury being removed from said amalgam decomposer and said aqueous alkali hydroxide flowing through said conduit to the bottom portion of said first cell and upwardly through said cell outside of said conduit in countercurrent flow to said alkali amalgam introduced into the upper portion of said first cell, said aqueous alkali hydroxide then being removed from said upper portion of said first cell.

7. An alkali amalgam decomposer comprising, in combination, a first decomposer cell; a second decomposer cell having a wall including a lower end portion removably positioned on top of said first decomposer cell and communicating with the same; sealing means for fluid-tightly connecting said first and second cells, said sealing means including two concentric continuous circular walls extending upwardly from said first cell and defining an annular space adapted to be filled with a sealing liquid, said lower end portion of said wall of said second cell extending into said annular space; means for introducing alkali amalgam into the upper portion of said first cell, said alkali amalgam flowing downwardly to the bottom portion of said first cell; a conduit having a funnel-shaped enlarged upper end portion extending from the lower portion of said second cell downwardly through substantially the entire length of said first cell; conduit means for passing alkali amalgam from the bottom portion of said first cell to the upper portion of said second cell said conduit means including pumping means for pumping said amalgam; water supply means for passing water into the upper portion of said second cell; mixing means located in the upper portion of said second cell for mixing water and alkali amalgam passed from said water supply means and from said conduit means, respectively, into said upper portion of said second cell, and for passing the thus-formed mixture into the main portion of said second cell; carrying means for carrying amalgam decomposition catalyst, arranged in said second cell between said upper portion thereof and said funnel-shaped enlarged upper end portion of said vertical conduit, said carrying means being adapted for passing fluids therethrough, whereby said mixture of water and alkali amalgam passing from said mixing means will be reacted upon contact with an amalgam decomposition catalyst carried by said carrying means so as to form mercury and an aqueous alkali hydroxide, said mercury and said aqueous alkali hydroxide passing through said carrying means; separating means located between said carrying means and said funnel-shaped end portion of said conduit for separating mercury from aqueous alkali hydroxide and for passing said aqueous alkali hydroxide into said funnel-shaped end portion; means for removing aqueous alkali hydroxide from the upper portion of said first cell; and means for removing said separated mercury from said amalgam decomposer, whereby amalgam introduced into said upper portion of said first cell will pass in countercurrent with aqueous alkali hydroxide downwardly through said first cell into said conduit means and through said conduit means into said mixing means, a mixture of water and alkali amalgam formed in said mixing means will pass in parallel current through said carrying means in said second cell, and will be reacted by an amalgam decomposition catalyst on said carrying means so as to form mercury and aqueous alkali hydroxide, said mixture being separated into mercury and aqueous alkali hydroxide, respectively, said mercury being removed from said amalgam decomposer and said aqueous alkali hydroxide flowing through said conduit to the bottom portion of said first cell and upwardly through said cell outside of said conduit in countercurrent flow to said alkali amalgam introduced into the upper portion of said first cell, said aqueous alkali hydroxide then being removed from said upper portion of said first cell.

8. An amalgam decomposer as defined in claim 7 and including second carrying means for carrying amalgam decomposition catalyst, said second carrying means being arranged in said first cell below said means for removing aqueous alkali hydroxide therefrom, for partial decomposition of said downwardly flowing amalgam by said upwardly flowing aqueous alkali hydroxide when the same come in contact with an amalgam decomposition catalyst located on said second carrying means.

9. In an amalgam decomposer as defined in claim 7, a lid covering the upper portion of said second cell, said mixing means being mounted on said lid; and second sealing means for fluid-tightly connecting said lid and said second cell.

10. A method of decomposing an amalgam, comprising the steps of introducing an amalgam into a fiirst decomposer cell permitting it to pass therethrough; pretreating said amalgam in said first decomposer cell in counter current flow with an aqueous hydroxide; transferring said pretreated amalgam after having passed through said first decomposer cell into a second decomposer cell permitting it to pass through the same; passing water through said second decomposer cell in parallel current to said pretreated amalgam passing therethrough, thereby forming from said amalgam and water, mercury and an aqueous hydroxide; separating the thus-formed mercury and aqueous hydroxide from each other; and introducing said separated aqueous hydroxide into said first decomposer cell for pretreating amalgam therein.

11. A method of decomposing an amalgam, comprising the steps of introducing an alkali amalgam into a first decomposer cell permitting it to pass therethrough; pretreating said alkali amalgam in said first decomposer cell in countercurrent flow with an aqueous alkali hydroxide; transferring said pretreated alkali amalgam after having passed through said first decomposer cell into a second decomposed cell permitting it to pass through the same; passing water through said second decomposer cell in parallel current to said pretreated alkali amalgam passing therethrough, thereby forming from said alkali amalgam and water, mercury and an aqueous alkali hydroxide; separating the thus-formed mercury and aqueous alkali hydroxide from each other; recovering said thus-formed mercury; and introducing said separated aqueous alkali hydroxide into said first decomposer cell for pretreating alkali amalgam therein.

12. A method of decomposing an amalgam, comprising the steps of introducing an alkali amalgam into a first decomposer cell permitting it to pass therethrough; pretreating said alkali amalgam in said first decomposer cell in countercurrent flow with an aqueous alkali hydroxide; transferring said pretreated alkali amalgam after having passed through said first decomposer cell into a second decomposer cell permitting it to pass through the same; passing water through said second decomposer cell in parallel current to said pretrated alkali amalgam passing therethrough; contacting said water and said pretreated alkali amalgam while passing through said second decomposer cell with an amalgam decomposition catalyst, thereby forming from said alkali amalgam and water, mercury and an aqueous alkali hydroxide; separating the thus-formed mercury and aqueous alkali hydroxide from each other; recovering said thus-formed mercury; and introducing said separated aqueous alkali hydroxide into said first decomposer cell for pretreating alkali amalgam therein.

References Cited in the file of this patent
UNITED STATES PATENTS
623,693     Acker _____ Apr. 25, 1899